(12) United States Patent
Beck et al.

(10) Patent No.: US 9,798,644 B2
(45) Date of Patent: Oct. 24, 2017

(54) MONITORING SYSTEM PERFORMANCE WITH PATTERN EVENT DETECTION

(71) Applicants: Laura Beck, Highland Park, NJ (US); Rajagopal Marripalli, Hyderabad (IN); Timothy Smith, Austin, TX (US)

(72) Inventors: Laura Beck, Highland Park, NJ (US); Rajagopal Marripalli, Hyderabad (IN); Timothy Smith, Austin, TX (US)

(73) Assignee: CA, Inc., New York, NY (US)

( * ) Notice: Subject to any disclaimer, the term of this patent is extended or adjusted under 35 U.S.C. 154(b) by 139 days.

(21) Appl. No.: 14/278,042

(22) Filed: May 15, 2014

(65) Prior Publication Data

US 2015/0332488 A1    Nov. 19, 2015

(51) Int. Cl.
G06F 11/34    (2006.01)
G06T 11/20    (2006.01)
G06K 9/62    (2006.01)

(52) U.S. Cl.
CPC ...... *G06F 11/3409* (2013.01); *G06F 11/3452* (2013.01); *G06K 9/6201* (2013.01); *G06K 9/6267* (2013.01); *G06T 11/206* (2013.01); *G06F 2201/86* (2013.01)

(58) Field of Classification Search
None
See application file for complete search history.

(56) References Cited

U.S. PATENT DOCUMENTS

| | | | | |
|---|---|---|---|---|
| 5,506,955 A * | 4/1996 | Chen | ................... | G06F 11/3414 714/26 |
| 7,131,037 B1 * | 10/2006 | LeFaive | .............. | H04L 41/0631 714/46 |
| 7,225,250 B1 * | 5/2007 | Harrop | ................ | H04L 41/0681 709/223 |

(Continued)

OTHER PUBLICATIONS

Evan Hoke, Jimeng Sun, John D. Strunk, Gregory R. Ganger, Christos Faloutsos, InteMon: Continuous Mining of Sensor Data in Largescale Self Infrastructures, 2006, ACM SIGOPS Operating Systems Review, 40(3): pp. 38-44.*

(Continued)

*Primary Examiner* — Michael J Cobb
(74) *Attorney, Agent, or Firm* — Baker Botts L.L.P.

(57) ABSTRACT

A method includes receiving a plurality of metric-pattern combinations, each including a respective performance metric and a respective graph pattern. The method also includes receiving a corresponding parameter value for a parameter of each respective graph pattern. The method further includes determining an event equation comprising the plurality of metric-pattern combinations and a boolean operator. The method still further includes evaluating the event equation by determining a respective graph pattern fit curve by applying the corresponding parameter value to the respective graph pattern, and determining an operand value based on whether associated performance data for the respective performance metric exhibits the associated graph pattern by matching the respective graph pattern fit curve to the associated performance data. Evaluating the operand (Continued)

values using the boolean operator to determine a result. The method additionally includes displaying a notification, at a user interface, based on the result.

17 Claims, 6 Drawing Sheets

(56) References Cited

U.S. PATENT DOCUMENTS

| | | | | |
|---|---|---|---|---|
| 8,074,206 B2* | 12/2011 | Sauermann | ......... | G06F 11/3612 717/130 |
| 2004/0012589 A1* | 1/2004 | Etgen | ............ | G06T 11/206 345/440 |
| 2004/0103076 A1* | 5/2004 | Casati | ............ | H04L 67/22 |
| 2005/0065753 A1* | 3/2005 | Bigus | ............ | G06N 5/048 702/186 |
| 2008/0097801 A1* | 4/2008 | MacLellan | ......... | G06F 11/3409 709/224 |
| 2008/0320123 A1* | 12/2008 | Houlihan | ............ | G06F 9/4856 709/224 |
| 2009/0172815 A1* | 7/2009 | Gu | ............ | G06F 21/552 726/23 |
| 2010/0115341 A1* | 5/2010 | Baker | ......... | G06F 11/0709 714/37 |
| 2011/0238376 A1* | 9/2011 | Dang | ......... | G06F 11/3409 702/186 |
| 2012/0220276 A1* | 8/2012 | Kobylarz | ......... | H04W 4/00 455/414.1 |

OTHER PUBLICATIONS

Immanuel Chan, Oracle Database Performance Tuning Guide, 10g Release 2 (10.2), Mar. 2008.
Minlan Yu, et al., Profiling Network Performance for Multi-Tier Data Center Applications, Mar. 2011.

* cited by examiner

MONITORING SYSTEM PERFORMANCE WITH PATTERN EVENT DETECTION

BACKGROUND

The disclosure relates generally to monitoring system performance, and more specifically, to monitoring system performance with pattern event detection.

SUMMARY

According to one embodiment of the disclosure, a method includes receiving a plurality of metric-pattern combinations, each including a respective performance metric and a respective graph pattern. The method also includes receiving a corresponding parameter value for a parameter of each respective graph pattern. The method further includes determining an event equation comprising the plurality of metric-pattern combinations and a boolean operator. The method still further includes evaluating the event equation by, for each metric-pattern combination in the event equation, determining a respective graph pattern fit curve by applying the corresponding parameter value to the respective graph pattern, and determining an operand value based on whether associated performance data for the respective performance metric exhibits the associated graph pattern by matching the respective graph pattern fit curve to the associated performance data. Evaluating the operand values using the boolean operator to determine a result. The method additionally includes displaying a notification, at a user interface, based on the result.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

IT organizations often look to performance management solutions to deliver business services while meeting end-user and customer expectations. Performance management solutions allow IT managers to manage complex applications across physical, virtual, cloud, and mainframe environments. These solutions may provide visibility across application tiers to help managers better understand the impact of network and infrastructure configuration.

Current performance management solutions may analyze performance data collected from a wide variety of system components. Current analyses methods may focus on detecting anomalies in the system data based on historical and/or expected data values. Other analyses methods may focus on determining whether performance data has exceeded or fallen below predetermined performance thresholds.

However, these systems may overlook certain critical events in the system performance lifecycle. For example, anomaly-based performance management solutions, i.e., performance management solutions using anomaly detection analysis methods, may under-report unacceptable performance conditions when the unacceptable condition becomes more regular. Thus, the system may adapt to thinking that an unacceptable condition is acceptable based on the regular occurrence of the condition.

As another example, anomaly-based performance management solutions may under-report system performance events that do not sufficiently deviate from the general performance data range. However, these events may be important to tracking and solving system problems before they become catastrophic.

As still another example, threshold-based performance management solutions may have arbitrary thresholds set that require manual monitoring and/or adjustment. Improper thresholds may trigger repeated notifications even during stable system operation. Even systems that learn or adapt to historical data when setting thresholds may overlook one-off events. Thus, an expected high-volume or traffic day may be regarded as a performance issue by such a system.

Thus, a need for a performance management solution that overcomes these shortcomings exists. In certain embodiments, the teachings of the present disclosure may address these concerns.

Figure 1:
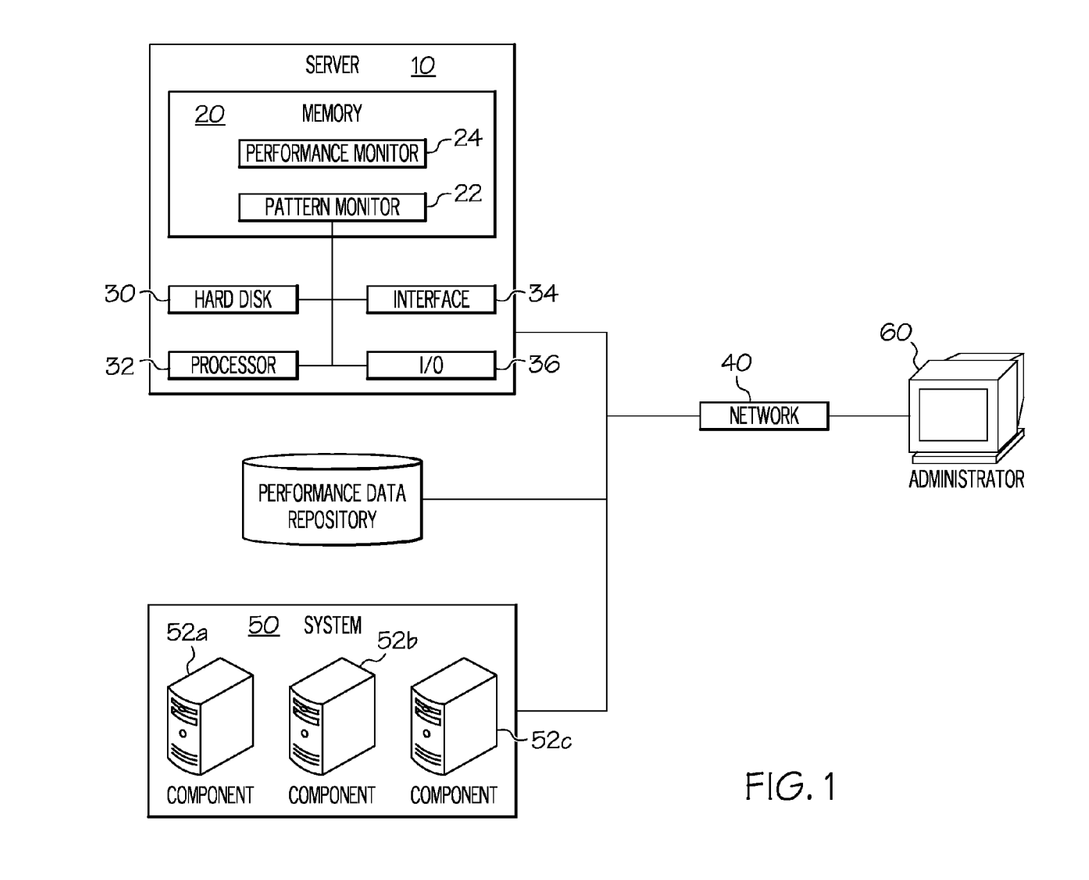
FIG. 1 illustrates a block diagram of a system for monitoring system performance with pattern event detection in accordance with a non-limiting embodiment of the present disclosure.

Referring to FIG. 1, a system for monitoring system performance with pattern event detection is illustrated in accordance with one particular embodiment of the present disclosure. The system illustrated in FIG. 1 includes a server 10, system 50, a performance data repository, and an administrator client 60. Server 10 includes memory 20, hard disk 30, interface 34, processor(s) 32, and input/output (I/O) 36. Server 10, system 50, the performance data repository, and administrator 60 are connected via network 40.

In certain embodiments, performance monitor 24 monitors application and/or system performance attributes of system 50, and components 52a-c. System 50 performance data may be stored in the performance data repository. Pattern monitor 22 may scan the performance data repository to detect specified patterns in system 50 performance data. This data may be historical performance data stored in the performance data repository, or may be live performance data coming directly from performance monitor 24. Pattern monitor 22 may obtain performance data from a wide variety of data sources not explicitly referred to herein.

Pattern monitor 22 may use defined graph patterns and trends to detect performance events in system 50 performance. Events may be pre-defined as equations with various parameters for customization, so that the system may be tailored to detect problematic or beneficial performance metric-patterns in operation of system 50.

Administrator 60 may use a client machine to configure pattern parameters, metric-pattern combinations and event equation operators for structuring complex event definitions. Pattern monitor 22, along with performance monitor 24 may issue notifications to administrator 60 once event equation conditions have been met.

In certain embodiments, the seriousness of the event condition may be specified. In certain embodiments, the seriousness of metric-pattern combinations may be specified. For example, weights may be applied to metric-pattern combinations in an event equation. The weights may reflect various factors related to the seriousness or importance of the metric-pattern combination being triggered. The seriousness may determine the method of notification or event logging.

Figure 2:
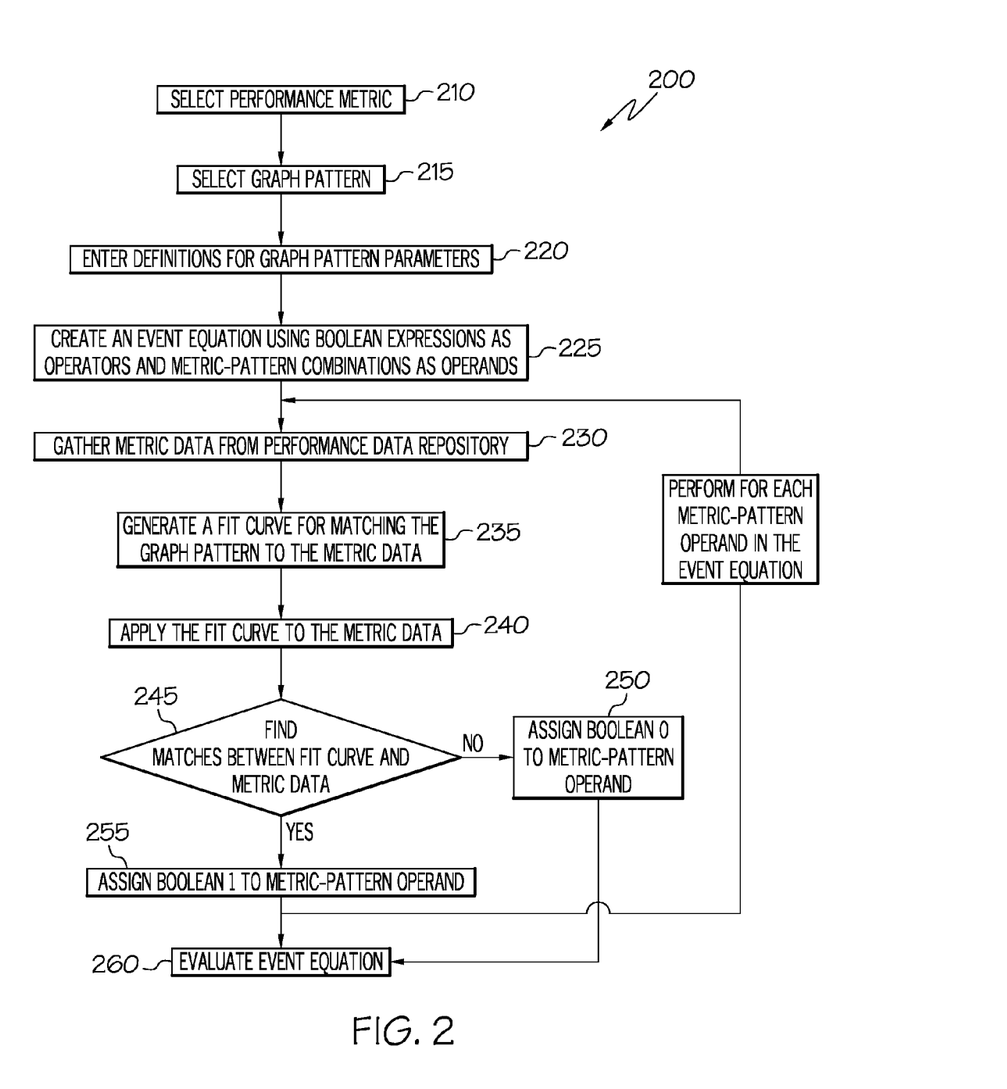
FIG. 2 illustrates a flow chart of a method for monitoring system performance with pattern event detection in accordance with a non-limiting embodiment of the present disclosure.

With reference to FIG. 2, a method 200 for monitoring system performance with pattern event detection is disclosed in accordance with a particular non-limiting embodiment of the present disclosure. At step 210, a performance metric is selected. For example, an administrator may select a performance metric from a group of available performance metrics that an application performance monitoring solution may track in a running system.

The performance metric may specify a type of raw data collected from a system, component, group of systems, virtual system, network, or the like. The raw data may be augmented into the desired performance metric. Often this is done to make the raw data easier to understand and/or more useful for performance monitoring operations. For example, data may be collected that measures the response time required for a server in a monitored system to respond to each user request. However, the server may receive a large amount of user requests. A performance metric may specify an augmented version of the raw server response times. The augmented version may average the server response times over a predetermined time period.

Example performance metrics may include average response time, maximum response time, error count, stall count, load, CPU usage, memory usage, dropped packets, and the like.

At step 215, a graph pattern is selected. A wide variety of graph patterns may be made available for selection by a user. The user may select a graph pattern in combination with the selected performance metric. Example graph patterns include trending up, trending down, repeated spikes, repeated dips, sudden increase, sudden decrease, fixed value, not fixed value, stable, fixed value (with integer), and the like.

Graph patterns may represent a trend, pattern, or correlation of data. Such data may be visualized via a graph. The patterns described may represent the trend, pattern, or correlation of the data if plotted on a graph with respect to time. In certain embodiments, the data may be collected and/or plotted with respect to any other attribute.

In certain embodiments, each graph pattern may have a set of configurable parameters that may describe certain characteristics of the graph pattern. This set of parameters may narrow the set of conforming events that the performance monitoring system identified within the performance data. For example, configurable parameters may include a minimum fit percentage and/or a confidence interval. In certain embodiments, parameters may refer to the slope of a trend line. In certain embodiments, parameters may refer to a range within which trend lines and/or pattern lines in performance data must conform to in order to trigger an event.

As another example, parameters may define the desired slope and intercept for linear graph patterns. As another example, parameters for parametric or quadratic curves may be entered. Thus, system 200 may identify patterns in performance metric data that conform to patterns specified by a user's selection of a graph pattern and parameter definition.

At step 220, definitions for graph pattern parameters may be entered. These parameter definitions may correspond to the configurable parameters for the graph patterns. Thus, characteristics of the graph patterns may be specified by supplying graph pattern parameters.

Parameter definitions may further specify a source for the performance metric data. For example, a particular server, application, or other component may be specified for metric-pattern analysis by selecting metric data from the corresponding component.

In certain embodiments, performance metric data for a specific component may be compared to performance metric data collected for a larger group of components in a system. For example, average server response time for a particular server may be compared to average server response time for all servers within a system. Conditions may be set within the event equation with respect to performance of particular components compared to performance of a group of components.

At step 225, an event equation is created. Connectors may be used to create conditions for satisfying an event equation with metric-pattern operands. For example, boolean operators may be provided that may allow a user to configure an event equation using metric-patterns as operands. The user may create an event equation that is triggered when the conditions in the equation are satisfied, or when a certain result is produced when the equation is evaluated.

For example, a series of metric-pattern combinations may be chained together using boolean algebra connectors. If the value of the evaluated equation is one or true, then an event corresponding to the event equation may be triggered. If the value of the evaluated equation remains zero, then the event is not triggered.

Thus, certain metric-pattern operands in the event equation may be found in the performance metric data and be evaluated as one in the event equation, but if the metric-pattern operands are joined together by an AND operator, then all metric-pattern operands may need to be evaluated as a one in order for the full expression of the event equation to evaluate as a one.

In certain embodiments, a "necessary" checkbox may be provided that labels the defined condition or metric-pattern combination as necessary or unnecessary to triggering the event defined in the event equation. If the "necessary" checkbox is checked, the metric-pattern combination may be added to the event equation with an AND operator. If the "necessary" checkbox is left unchecked, the metric-pattern combination may be added to the event equation with an OR operator.

In certain embodiments, event equations may be assigned negativity and/or positivity weightings. Such weightings may signify the relative negative effects that are associated with a particular event equation being triggered. For example, a medium negativity weighting may be assigned to an event equation where the percentage of time that a server spends in garbage collection is increasing. As another example, a high negativity weighting may be given to an event equation where average response time is spiking.

At step 230, metric data is gathered from a performance data repository. For example, system performance data may be stored in a database. The system may query the performance data database to retrieve raw data to process into metric data. As another example, the system may retrieve real-time performance metric data for the monitored system.

In certain embodiments, a source may be specified for the metric data. When a source is specified, metric data associated only with that source is retrieved for trend detection processing. In certain embodiments, "all components" may be specified. In this scenario, metric data for all tracked components may be retrieved.

At step 235, a fit curve for matching the graph pattern to the metric data is generated based on the graph pattern parameters. For example, a fit curve may be generated that contains an acceptable range of values that, when applied to performance metric data, detects areas in the performance metric data that may be said to conform to the fit curve.

As another example, a user may enter a slope parameter for an upward trending graph pattern. A fit curve may be generated with a predetermined level of allowed variance from the specified slope that allows for detection of conforming ranges within the performance metric data.

A fit curve for each metric-pattern combination in the event equation may be generated.

At step 240, each fit curve is applied to the performance metric data in order to find areas of the performance metric data where the fit curve matches. Each fit curve match produces a resulting boolean "one" or positive value for that operand in the trend event equation.

At step 245, matches between the performance metric data and the fit curve are detected. At step 250, Boolean "zero" or negative values are assigned to metric-pattern operands where no conforming portion of performance metric data is located. At step 255, Boolean "one" values are assigned to metric-pattern operands where a conforming portion of performance metric data is located. The process starting at step 230 is repeated for each metric-pattern operand in the event equation.

In certain embodiments, numerical values may be assigned to each metric-pattern combination based on a negativity weighting or any other weighting. Traditional algebraic expressions may be generated and evaluated in the context of the event equation. If the event equation has a resulting value that is higher than a certain level, then the event may be triggered.

For example, an event equation may specify a weighting of two to a first metric-pattern combination and a weighting of one to each of a series of two other metric-pattern combinations. No metric-pattern combination may be defined as necessary to triggering the defined event. However, the event equation may specify that the event equation should only be triggered when the equation has a value of 2 of more. Thus, if the first metric-pattern combination alone is triggered, that would be enough to trigger the event. However, if only one of the two other metric-pattern combinations is triggered and the first metric-pattern combination is not triggered, then the event will not be triggered.

At step 260, the event equation is evaluated. Any events are triggered accordingly. Notifications may also be sent. In certain embodiments, graphical user interface windows may notify a user, administrator, or manager of the event triggered by evaluation of the event equation. Notifications may further be dependent on the negativity or positivity weighting. For example, an event equation with a high negativity weighting may trigger an automated phone call or text message to a senior system administrator whenever the event is triggered. Thus, the administrator may be able to respond to the detected pattern and/or event before the system becomes paralyzed. Thus, action may be taken to remedy the situation before the system incurs any downtime.

Figure 3:
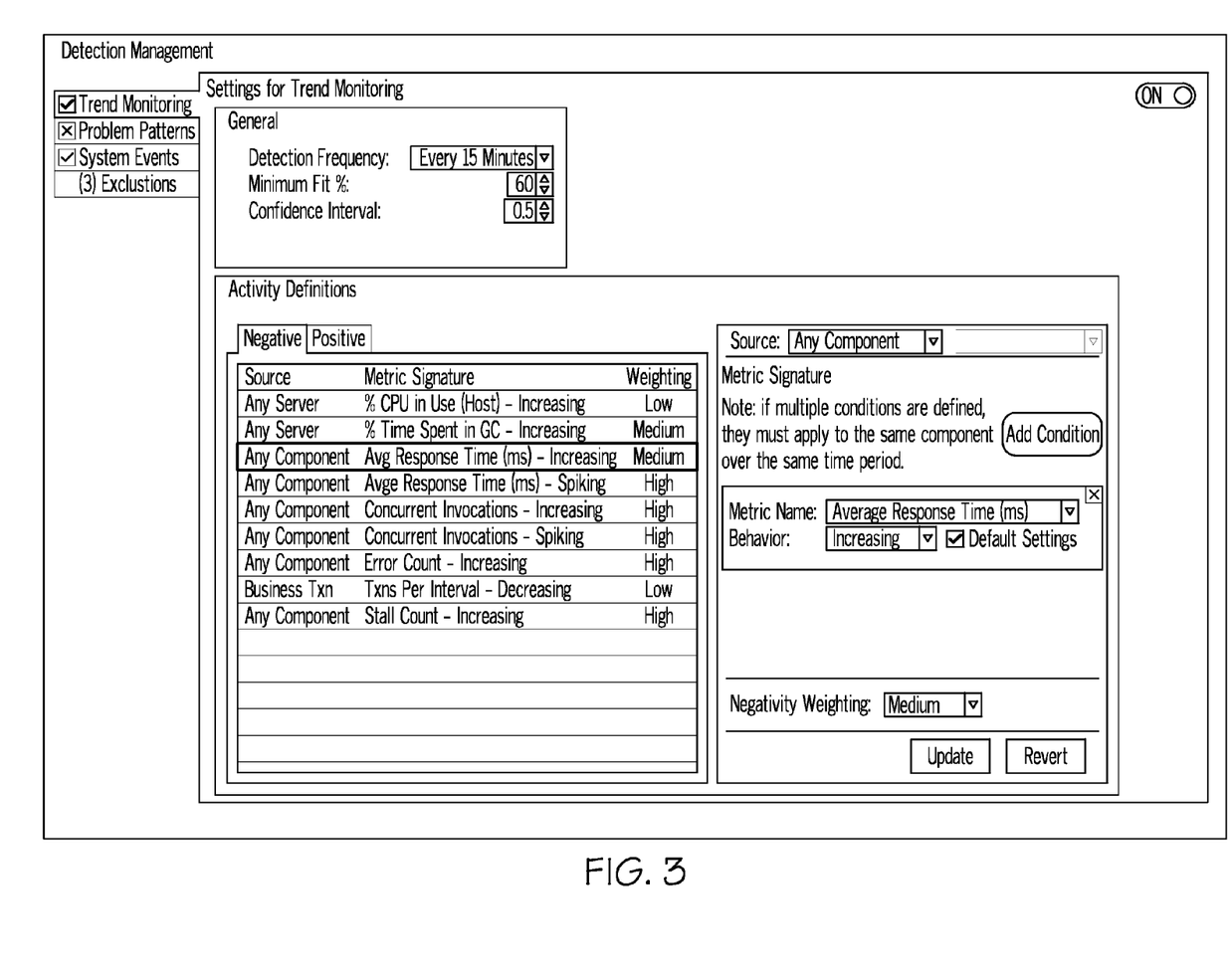
FIG. 3 illustrates a screenshot from a configuration interface in an implementation of a system for monitoring system performance with pattern event detection, presented in accordance with a non-limiting embodiment of the present disclosure.

With reference to FIGS. 3-6, example screenshots from a configuration interface in an implementation of a system for monitoring system performance with pattern event detection is presented in accordance with a non-limiting embodiment of the present disclosure. In FIG. 3, a user has selected a pattern event equation for display and editing. The metric-pattern combination is displayed as "Average Response Time" "Increasing." In this embodiment, the event equation includes only one metric-pattern combination. The user may edit the selected pattern event equation to add metric-pattern combinations as shown with reference to FIGS. 4-5.

Figure 4:
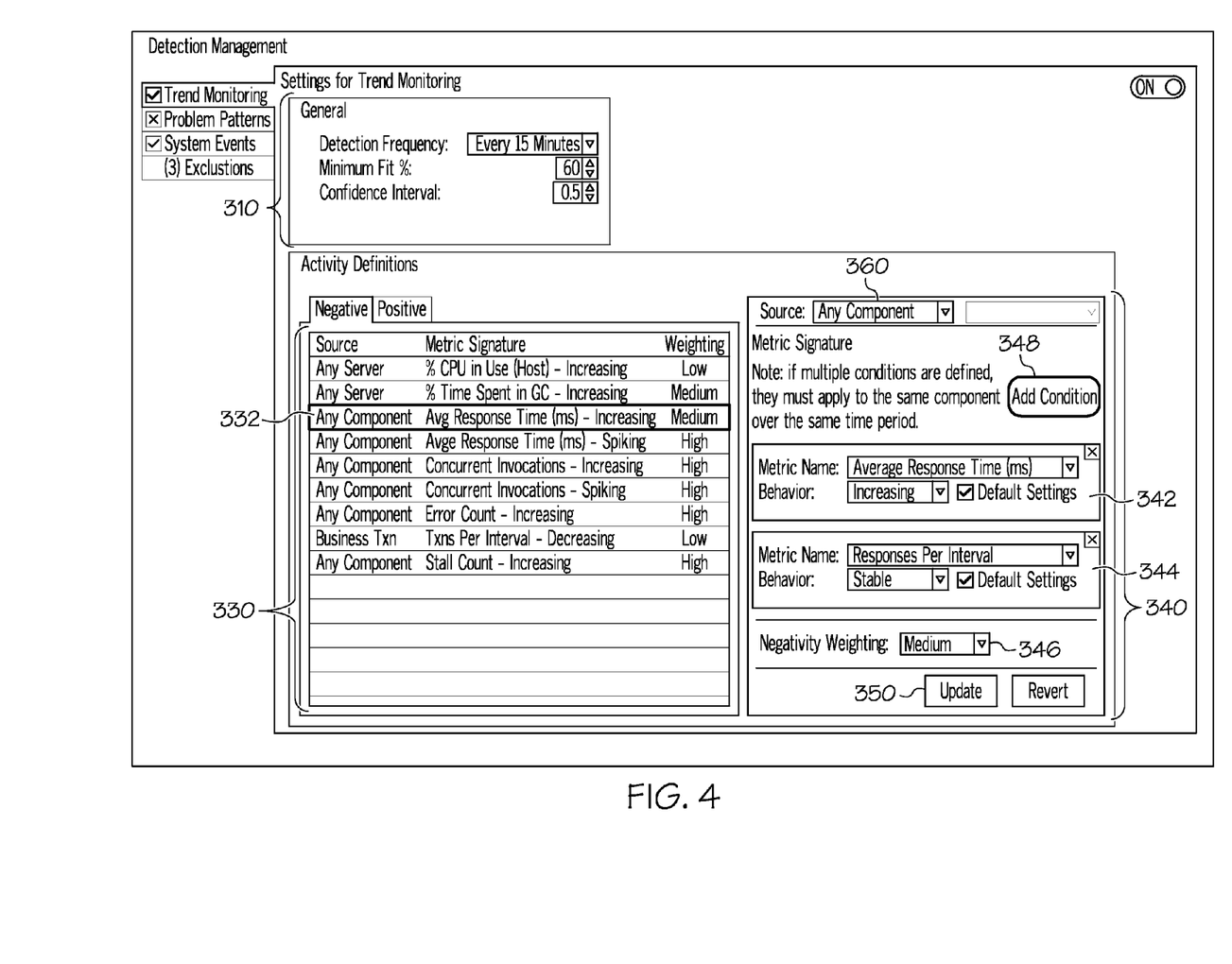
FIG. 4 illustrates a screenshot from a configuration interface in an implementation of a system for monitoring system performance with pattern event detection, presented in accordance with a non-limiting embodiment of the present disclosure.

For example, the user may click add condition button 348 in FIG. 4 to add a new metric-pattern combination 344 to the selected pattern event equation 332. The user may configure metric-pattern combinations 342-344, assign a negativity weighting 346 for the pattern event equation and update the event equation by selecting update button 350.

In FIG. 4, section 340 includes components for building a pattern event equation. Metric-pattern combination 342 and metric-pattern combination 344 each contain a metric name and behavior drop down. The metric name drop down has a different metric selected for each metric-pattern combination. Additionally, both metric-pattern combinations include a dropdown for behavior. A graph pattern may be selected in each dropdown for each metric-pattern combination.

Area 310 includes global pattern parameters that may be set. For example, minimum fit % may specify a buffer for fitting performance metric data to a fit curve. A fit curve may be generated for each metric-pattern combination based on these and other parameters.

In certain embodiments, an area of the user interface presented in FIG. 4 may include a global detection statistics area. This area may include global statistics for each event equation 332 in area 330. Source drop down 360 specifies the source for performance metric data analysis. Event equation 332 is currently being augmented in area 340. Add condition has been pressed, and a new metric-pattern combination is being defined. A negativity weighting is also being assigned to this event equation.

In certain embodiments, global detection statistics may summarize events triggered within a selected time period, such as, for example, the past 30 days. Activity occurrences may be classified as negative or positive. The number of occurrences, weight of the occurrences, and a score based on the occurrences may be displayed. Various other statistics may also be displayed regarding triggered events.

In certain embodiments, global pattern parameters may be overridden for each specific metric-pattern. For example, default values may be provided in area 310. These default values may be modified by a user. In certain embodiments, the parameter modifications may only be applied to a selected metric-pattern as opposed to modifying the global pattern parameters for all metric-patterns. The process of selecting event equations from area 330 and editing metric-pattern combinations in area 340 is described below with reference to FIGS. 5 and 6.

Figure 5:
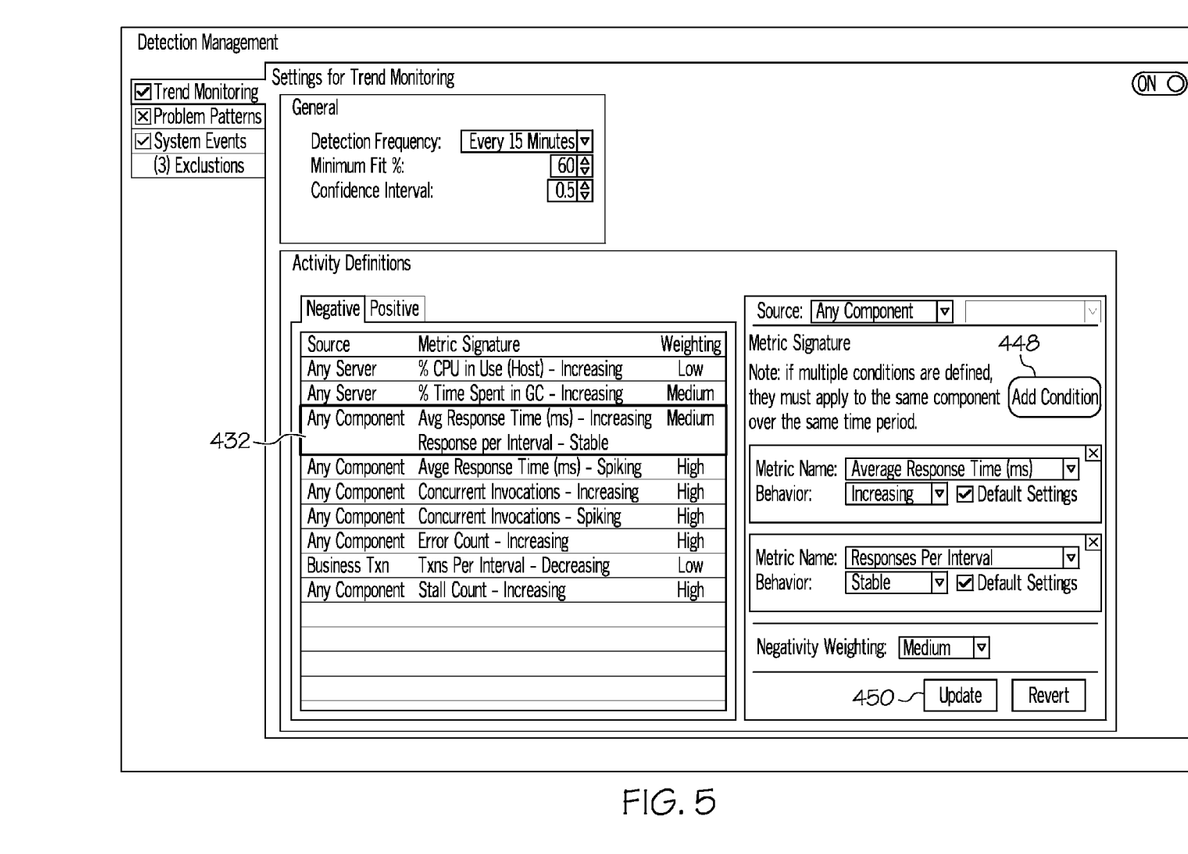
FIG. 5 illustrates a screenshot from a configuration interface in an implementation of a system for monitoring system performance with pattern event detection, presented in accordance with a non-limiting embodiment of the present disclosure.

In FIG. 5, a user has clicked update button 450 to update selected event equation 432 with the currently displayed metric-pattern parameter modifications. The user may add another metric-pattern combination to further modify event equation 432 using button 448.

Figure 6:
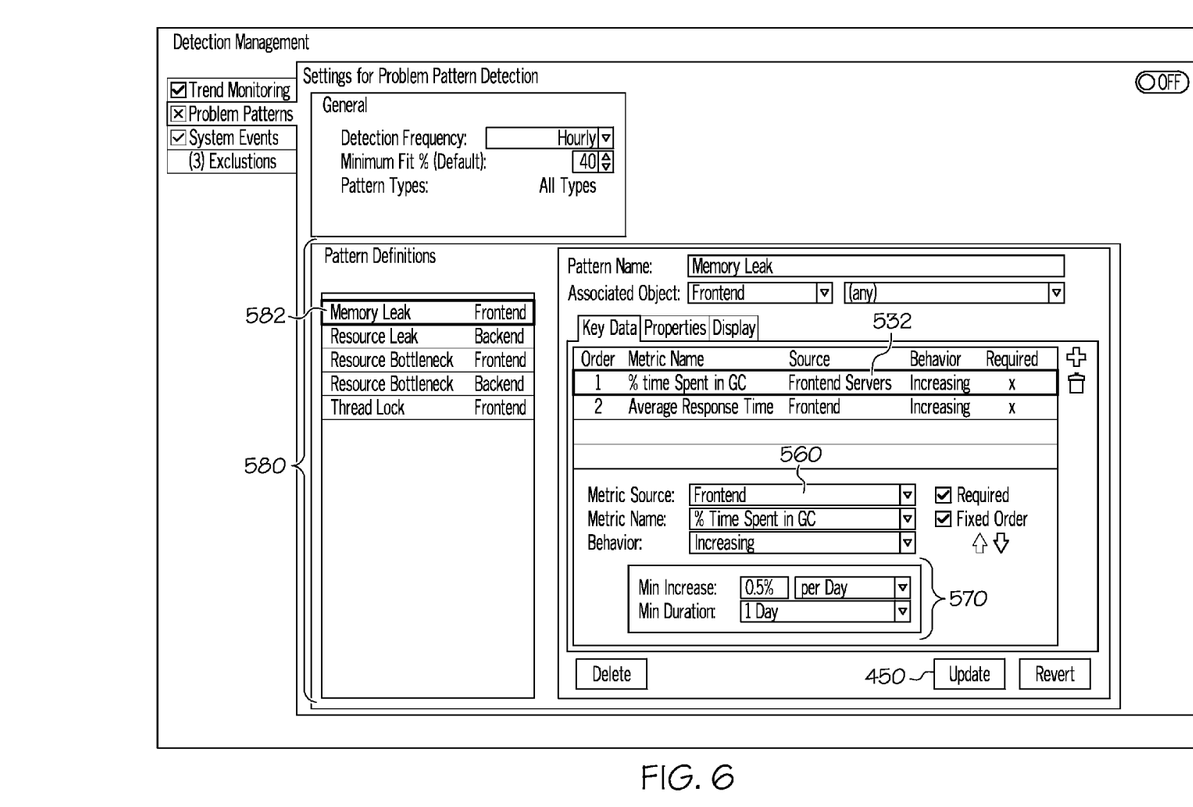
FIG. 6 illustrates a screenshot from a configuration interface in an implementation of a system for monitoring system performance with pattern event detection, presented in accordance with a non-limiting embodiment of the present disclosure.

In FIG. 6 patterns that are often difficult to detect, such as memory leaks, resource leaks, resource bottlenecks, and thread locks are defined using a slightly different user interface. Metric source 560 may be specified in relation to an associated object using Pattern Definitions interface panel 580. Metric source 560 may be specified for each metric-pattern combination in the selected pattern definition 582. For example, the associated object specified in FIG. 6 may be a frontend being assessed for the memory leak. Metric source 532 may reference frontend servers supporting the frontend associated object. Metric data may be collected regarding a percentage of time that these servers are spending and/or have spent in garbage collection.

Periodic parameters 570 may also be specified and applied to metric-pattern combinations. Metric-pattern combinations may also be ordered and marked as required or not required for triggering of the defined event.

In certain embodiments, the teachings of the present disclosure may enable application and system performance monitoring for complex enterprise systems. Successful monitoring may require the ability to detect individual trends and combinations of trends. Knowledge of these events may enable certain embodiments of the systems described herein to spot problems before they cause system performance degradation and/or failure.

In certain embodiments, system performance problems may be identified before they cause infrastructure issues. For example, infrastructure issues may include severe service outages, service level agreement violations, end-user-facing failures, or the like.

In some instances, metrics and potential problems may be well known. For example, databases and/or networks may often be measured using well known performance measurements and/or criteria. In certain embodiments, monitors that look for specific trends and combinations of trends may be established for such well known problems.

In some instances, metrics and potential problems may be more obscure. For example, certain performance issues may be less understood because of complex system configuration or other system complexity. As another example, certain systems may be highly dynamic, such as applications. For these systems, a more generic solution may be provided by the teachings of the present disclosure.

Certain application monitoring solutions provided today may rely on fixed thresholds to trigger problem events. For these thresholds to be useful, knowledge of expected behavior may be required. For example, a threshold may be useless if it is arbitrarily set. The standard performance range may be either well above the threshold or well below the threshold. Thus, some knowledge of the expected performance range may be used to set and/or modify the threshold.

Such knowledge of expected behavior and/or operating ranges may come from learning a system. This process may be referred to as baselining, and may be conducted manually, or may be automated.

Other application monitoring solutions may involve anomaly detection. Anomaly detection may include evaluating trends and patterns across multiple metrics against a learned state, such as a normal operating state.

However, repeated and/or persistent anomalies may not be considered anomalous by an anomaly-based performance monitoring system. For example, an anomaly detection system that relies on past system performance when evaluating outlying operating ranges may not detect spikes in operating metrics once they become the norm. Similarly, long-term problems, such as gradually increasing trends, may also not be detected by such performance monitoring systems. Thus, problematic trends and patterns need to be matched against available data on an ongoing basis in order to properly assess the status of such systems.

In certain embodiments, positive trends or patterns may be detected using the teachings of the present disclosure. Thus, both positive and negative performance events may be reported, for example to a system administrator.

In certain embodiments, the system may be assessed for overall health or problem states. For example, a combination of positive and negative events that are detected over a specified time period may contribute to such an evaluation. In certain embodiments, such events may be weighted. In certain embodiments, the events may be grouped according to time period or other criteria.

In certain embodiments, a total health score or problem score for the system may be calculated. Thresholds may be extracted from these scores to trigger status displays or other forms of alerts. For example, when a health score reaches a threshold health score, an alert or other display may be generated to notify the user. Further, certain specific events may drive status displays and/or alerts.

In certain embodiments, the systems described in accordance with the present disclosure may enhance existing performance monitoring solutions. For example, existing anomaly detection systems may be enhanced by applying the same positive-negative scoring to determine whether a particular anomaly represents a positive or negative change in the system.

In certain embodiments, a system may be devised that may respond to simple threshold violations by checking related data for relevant trends. For example, a user may be told that a particular application has exceeded its service level agreement threshold for response time. Particular components within an application may be indicated as exhibiting problem patterns for response time. These components may be assessed for matches against problem patterns that are commonly associated with response time problems. Matching components may then be reported to the user as potential causes of the detected threshold violations.

In certain embodiments, specific patterns of behavior for specific metrics may be identified. Such patterns in these metrics may be identified automatically. Instead of relying on fixed thresholds or anomaly detection triggers as indicating problematic trends in the data, such patterns may be triggered before any noticeable performance degradation is experienced.

In certain embodiments, classes of metrics may be associated with a particular pattern. In certain embodiments, parameters may be defined that may expand or contract the acceptable range within which the metric data should lie in order to trigger a match with a particular pattern. Metric classes, pattern definitions, and ranges may be user-defined, enabling customization.

Thus, the teachings of the present disclosure may provide a more generic performance monitoring solution than those currently available. For example, existing performance monitoring solutions may have strictly defined thresholds and/or anomaly detection algorithms that may exhibit some of the problems discussed in more detail above.

In certain embodiments, characteristics associated with bad and/or good performance of monitored system elements may be identified. For example, an average or maximum time for a server response time may be associated with poor system performance. As another example, a number of errors for a particular system element may be associated within an allowable range of errors for good system performance. As yet another example, characteristics such as stall count, load, CPU usage, memory usage, dropped packets, and other metric categories may be may be associated with bad and/or good system performance.

In certain embodiments, trends or patterns may be identified for each of the defined characteristics. Each trend or pattern may be classified as positive or negative. For example, patterns may include one or more of: trending up, trending down, repeated spikes, repeated dips, sudden increase, sudden decrease, fixed value, not fixed value, and/or stable.

In certain embodiments, each trend may be identified as exhibiting either good or bad system performance. For example, upward trends may generally be associated with negative system performance. As another example, downward trends may generally be associated with positive system performance.

However, certain trends may have an opposite system performance classification mapping. For example, an upward trend in throughput may be a positive signal and may be associated with positive system performance. Similarly, an upward trend in business value may be associated with positive system performance.

As another example, the repeated spikes trend may usually be associated with negative system performance. Certain trends may be unavoidable. For example, repeated spikes may be exhibited on days where system load is expected to be busy due to some special event. Though sometimes, this trend may be neutral or even positive.

As another example, a fixed value (zero) trend may be positive, such as with respect to error count. In certain embodiments, this trend may be negative, such as with response time, throughput, or earnings.

In certain embodiments, parameters for each trend or pattern are specified for detection purposes. Example parameters may include: minimum time period for pattern to be observed; minimum degree of trend (i.e., slope); minimum deviation in the data over a time period; minimum deviation in the data per spike (i.e., sudden change); and specific thresholds such as minimum degree of trend or absolute values to equal, exceed, or fall below.

For example, a characteristic/trend combination may be selected. A parameter definition may be provided for the characteristic/trend combination. For example, the parameter definition provided for an average response time trending up characteristic/trend combination may be "best fit curve must show a positive slope for a minimum of one hour, having a total deviation of at least five percent." Such a parameter definition may require that the value of the average response time at the end of the time period must be 5% higher than the value at the start of the response time data. As another example, a parameter definition provided for an error count sudden increase characteristic/trend combination may be "increase of more than 2% over a one minute period, followed by at least 5 minutes of persistence."

In certain embodiments, confidence interval or fit could also be specified. These parameters may specify how tightly the metric data must fit the defined parameters. These parameters may also specify how unlikely the pattern is to be created in the metric data due to chance.

In certain embodiments, trends or patterns may be given a weighting to qualify how negative or positive an event is. For example, a characteristic/trend combination error count sudden increase may be assigned a higher weight than the characteristic/trend combination CPU usage trending up. This may be done if, for example, jumps in error count are considered a more serious problem than a steady increase in CPU utilization.

More complex rules may also be defined. For example, boolean qualifiers may be inserted in between characteristic/trend combinations in order to create chained triggers. In certain embodiments, a combination of two or more simple trends or patterns may constitute the negative or positive event. For example, the characteristic/trend combination average response time trending up AND the characteristic/trend combination response count trending down, when triggered together may register as a negative event.

As another example, the characteristic/trend combination average response time trending down AND the characteristic/trend combination response count stable, when triggered together may register as a positive event. Further combinations of parameters, modifiers, characteristics, trends, patterns, and definitions may be customized and defined without departing from the scope of the present disclosure.

The patterns and rules discussed in accordance with the present disclosure may be further refined by specifying a source parameter for the performance characteristic. For example, the source might identify a type of element, such as any frontend component. The source parameter may additionally specify a set of similar elements, such as a specific frontend component running on any server. The source parameter may specify a specific element. For example, the source parameter may specify frontend component "A" running on host X.

In certain embodiments, separate pattern definitions may then be created for a given characteristic from different sources. For example, a definition may specify that host X's CPU usage must exceed a certain level in order to be considered a negative component trend. This level may differ from a pattern definition for host Y's CPU usage, which may specify a much lower level in order to be considered a negative component trend. As another example, a definition may increase the amount of time that frontend response times have to rise, while a second definition may lower a minimum deviation for other component response times before triggering a negative system trend. Rules with more specific sources, such as those naming particular system components, may take precedence over rules with less-specific or unspecific sources.

In certain embodiments, specific pattern and/or rule matches may be associated with one or more system actions. A match on that pattern or rule may trigger a user notification or some other action by the system. For example, an alert may be sent to an administrator when a negative system trend is detected.

In certain embodiments, the performance monitoring system may check whether any characteristics of the specified types and sources match any associated patterns and/or rules. For example, the system may scan characteristic data to determine whether any characteristic/trend combination is exhibited in any historical or incoming system performance data. Detection of trends and patterns may be carried out on an ongoing basis. For example, trends and patterns may be scanned for every 10 minutes, or once a day. The scope of scanned data may be specified. For example, a daily scan may examine only the preceding day's resource data. In certain embodiments, the performance monitoring system may begin a new scan when a trigger or event is reached, such as a threshold violation or a detected anomaly.

In certain embodiments, general scores may be determined based on performance of the system as a whole. For example, an overall health score or problem score may be computed for a given element, component, application, or system. Such scores may be computed by combining weighted values of detected trends and patterns for the system's associated characteristics. Such scores may be assigned thresholds, such as global, application, or element-wide thresholds, that determine status displays and/or trigger more active notifications of detected system problems.

These general scores may be used to assess anomalies detected by other performance monitoring systems. For example, unusual patterns of system performance behavior can be identified as good, bad, or problematic based on the specific characteristics and detected patterns involved. This may allow associated notifications or displays to be limited to bad anomalies or even bad anomalies with a negativity score greater than a predetermined amount.

In certain embodiments, users may be notified of specific rule matches, i.e., problem events or good performance events. These notifications may include links to a display of the corresponding data, which may be fitted with trend lines or similar annotations that identify the detected pattern in the component data.

In certain embodiments, users may review these events and provide feedback to the performance monitoring system on the events. Such functionality may allow the system to adapt and adjust its parameters for some or all elements. For example, the user may modify definitions and/or characteristic/trend combinations based on triggered events.

In certain embodiments, users may request ad hoc matches of rules for specific sets of data. For example, a user may specify a time range and a frontend and query whether any associated data fits any known problem event definitions. This may be useful in the case where a metric-pattern combination was not specified correctly, or where the metric-pattern combination has since been revised to better detect problems. Thus, event definitions may be corrected and run again on the same set of data.

A user interface may show trends, correlation and fit statistics per trend, and an overall calculation of fit for the rule. In certain embodiments, a user may search a database of previously triggered events, and/or previously captured trend matches.

In certain embodiments, the teachings of the present disclosure may detect trends and patterns in system data. These trends and patterns may be detected using retrospective data or otherwise historical data. In certain embodiments, these trends and patterns may be detected on a prospective, or forward looking, basis.

In certain embodiments, trend and pattern detection methods may be leveraged. For example, trend and pattern detection methods may be applied to specific measures over specific time ranges. In certain embodiments, trend and pattern detection methods may be assessed against specific criteria.

In certain embodiments, the trends and patterns searched for may depend on the type of data that is being searched. For example, the systems described herein may look for certain trends and patterns in data from databases and related components. As another example, the system may look for a different type of trend and/or pattern in data from networks.

In the application performance context, specific problems have been measured. For example, bottlenecks in parallel applications have been detected. As another example, memory leaks have been detected.

In certain embodiments, a solution for detecting trends and patterns in a wide variety of data is presented. The solution may thus be data-agnostic. Data-agnostic may refer to systems capable of analyzing or interpreting a wide variety of system performance data, efficiency data, or any other kind of system data. The solution may thus include a flexible and generic system that is capable of analyzing a wide variety of data types and classifying the data.

In certain embodiments, the system may merely use a specification of a type of data. For example, a data type may be classified as response time data. As another example, the data type may be classified as response time from a certain type of component. As yet another example, the data may be classified as response time from a particular named component.

In certain embodiments, the system may use a specified pattern. For example, the specified pattern may instruct the system to look for upward trends. As another example, the specified pattern may instruct the system to look for downward trends. As yet another example, the specified pattern may instruct the system to look for patterns where the metric is jumping up. As still another example, the specified pattern may instruct the system to look for patterns where the metric is spiking.

In certain embodiments, the system may classify detected patterns, and provide a designation of the pattern as good or bad, without performing any baselining or anomaly detection. For example, the system may not require any learning of normal operation characteristics. As another example, the system may not require that the behavior detected is unusual. For example, trends may be detected from variations in analyzed metrics even when those metrics do not vary with respect to any normal operation level.

Problems may arise in using anomaly detection to classify system problems. For example, once performance lags occur regularly, they may not be detected by anomaly detection algorithms. The poor performance may then become the norm, with the system only detecting even worse performance.

Similar problems may arise in using baselining. For example, if the baseline is measured during normal system operation, the baseline may be skewed. System metric measurements that do not depart from these measurements may still exhibit unacceptable or poor performance characteristics.

Thus, the teachings of the present disclosure may avoid certain pitfalls of the above mentioned approaches in detecting trends and patterns in system metric data.

In certain embodiments, data may be matched to good or bad patterns. When a match occurs, it may be considered an event that may trigger execution of certain processes. For example, an event may be converted to a score and reported to a user. As another example, an event may trigger an alert that may be sent to a user. As another example, an event may be combined with other events. The combination of events may be converted to a score and may be presented to the user along with details on the contributing events.

In certain embodiments, each event may trigger a notification or other action. Events may be logically combined into one or more complex events with more weight applied to the complex event, reflecting the repeated nature of the event.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   measuring, using a server, performance data for a plurality of computing systems in network;
   determining, using the server, an event equation comprising a plurality of operands and one or more boolean operators from a graphical user interface, each of the plurality of operands being associated with (1) a performance metric, (2) a system component, and (3) a specified behavior of the performance metric for the system component, wherein the event equation is indicative of a series of performance characteristics that are symptomatic of an underlying performance problem on the network if they occur at the same time, and wherein each specified behavior is within a determined normal operation level of the performance metric;
   evaluating the event equation using the server, by:
      for each operand, automatically determining a boolean value for the operand by determining whether a monitored behavior of the performance metric for the system component matches the specified behavior; and
      evaluating the event equation comprising the determined operand values using the one or more boolean operators to diagnose
   a particular component on the network for which the performance data is being measured with the underlying performance problem;
   directing a notification to one or more different individuals, the one or more individuals selected based on the diagnosed underlying performance problem; and
   displaying the notification of the diagnosed performance problem.

2. The method of claim 1, further comprising:
   adding a selected metric-pattern combination to the event equation;
   connecting the selected metric-pattern combination to the event equation using a second boolean operator of the one or more boolean operators; and
   evaluating the event equation using the selected metric-pattern combination and the second boolean operator.

3. The method of claim 1, further comprising:
   receiving a negative behavior categorization for the event equation;
   in response to evaluating the event equation, determining an appropriate notification method based on the negative behavior categorization; and
   displaying the notification further based on the appropriate notification method.

4. The method of claim 1, further comprising:
   assigning a weight to each operand;
   in response to evaluating the event equation, determining an appropriate notification method based on the operand values and the assigned weights; and
   displaying the notification further based on the appropriate notification method.

5. The method of claim 1, further comprising:
   collecting performance data for one of the performance metrics from a corresponding system component.

6. The method of claim 1, wherein the specified behavior for a first operand is average response time.

7. A computer configured to access a storage device, the computer comprising:
   a processor; and
   a non-transitory, computer-readable storage medium storing computer-readable instructions that when executed by the processor cause the computer to perform:
      measuring, using the processor, performance data for a plurality of computing systems in a network;
      determining, using the processor, an event equation comprising a plurality of operands and one or more boolean operators from a graphical user interface, each of the plurality of operands being associated with (1) a performance metric, (2) a system component, and (3) a specified behavior of the performance metric for the system component, wherein the event equation is indicative of a series of performance characteristics that are symptomatic of an underlying performance problem on the network if they occur at the same time, and wherein each specified behavior is within a determined normal operation level of the performance metric;
      evaluating the event equation using the processor, by:
         for each operand, automatically determining a boolean value for the operand by determining whether a monitored behavior of the performance metric for the system component matches the specified behavior; and
         evaluating the event equation comprising the determined operand values using the one or more boolean operators to diagnose
      a particular component on the network for which the performance data is being measured with the underlying performance problem;
      directing a notification to one or more different individuals, the one or more individuals selected based on the diagnosed underlying performance problem; and
      displaying the notification of the diagnosed performance problem.

8. The computer of claim 7, wherein the computer-readable instructions further cause the computer to perform:
   adding a selected metric-pattern combination to the event equation;
   connecting the selected metric-pattern combination to the event equation using a second boolean operator of the one or more boolean operators; and
   evaluating the event equation using the selected metric-pattern combination and the second boolean operator.

9. The computer of claim 7, wherein the computer-readable instructions further cause the computer to perform:
   receiving a negative behavior categorization for the event equation;
   in response to evaluating the event equation, determining an appropriate notification method based on the negative behavior categorization; and displaying the notification further based on the appropriate notification method.

10. The computer of claim 7, wherein the computer-readable instructions further cause the computer to perform:
assigning a weight to each operand;
in response to evaluating the event equation, determining an appropriate notification method based on the operand values and the assigned weights; and
displaying the notification further based on the appropriate notification method.

11. The computer of claim 7, wherein the computer-readable instructions further cause the computer to perform:
collecting performance data for one of the performance metrics from a corresponding system component.

12. The computer of claim 7, wherein the specified behavior for a first operand is average response time.

13. A computer program product comprising:
a non-transitory computer-readable storage medium having computer-readable program code embodied therewith, the computer-readable program code comprising:
computer-readable program code configured to measure, using a server, performance data for a plurality of computing systems in a network;
computer-readable program code configured to determine, using the server, an event equation comprising a plurality of operands and one or more boolean operators from a graphical user interface, each of the plurality of operands being associated with (1) a performance metric, (2) a system component, and (3) a specified behavior of the performance metric for the system component, wherein the event equation is indicative of a series of performance characteristics that are symptomatic of an underlying performance problem on the network if they occur at the same time, and wherein each specified behavior is within a determined normal operation level of the performance metric;
computer-readable program code configured to evaluate the event equation using the server, by:
for each operand, automatically determining a boolean value for the operand by determining whether a monitored behavior of the performance metric for the system component matches the specified behavior; and
evaluating the event equation comprising the determined operand values using the one or more boolean operators to
diagnose a particular component on the network with the underlying performance problem;
computer-readable program code configured to direct a notification to one or more different individuals, the one or more individuals selected based on the diagnosed underlying performance problem; and
computer-readable program code configured to display the notification of the diagnosed performance problem.

14. The computer program product of claim 13, wherein the computer-readable program code further comprises:
computer-readable program code configured to add a selected metric-pattern combination to the event equation;
computer-readable program code configured to connect the selected metric-pattern combination to the event equation using a second boolean operator of the one or more boolean operators; and
computer-readable program code configured to evaluate the event equation using the selected metric-pattern combination and the second boolean operator.

15. The computer program product of claim 13, wherein the computer-readable program code further comprises:
computer-readable program code configured to receive a negative behavior categorization for the event equation;
computer-readable program code configured to, in response to evaluating the event equation, determine an appropriate notification method based on the negative behavior categorization; and
computer-readable program code configured to display the notification further based on the appropriate notification method.

16. The computer program product of claim 13, wherein the computer-readable program code further comprises:
computer-readable program code configured to assign a weight to each operand;
computer-readable program code configured to, in response to evaluating the event equation, determine an appropriate notification method based on the operand values and the assigned weights; and
computer-readable program code configured to display the notification further based on the appropriate notification method.

17. The computer program product of claim 13, wherein the computer-readable program code further comprises:
computer-readable program code configured to collect performance data for one of the performance metrics from a corresponding system component.

* * * * *